(12) United States Patent
Chan et al.

(10) Patent No.: US 11,724,432 B2
(45) Date of Patent: Aug. 15, 2023

(54) TRANSPARENT PLASTIC INTEGRALLY MOLDED GOBLET

(71) Applicant: LIVING FOUNTAIN PLASTIC INDUSTRIAL CO., LTD., Taichung (TW)

(72) Inventors: Ching-Chung Chan, Taichung (TW); Chun-Hsiang Cheng, Taichung (TW)

( * ) Notice: Subject to any disclaimer, the term of this patent is extended or adjusted under 35 U.S.C. 154(b) by 24 days.

(21) Appl. No.: 17/549,354

(22) Filed: Dec. 13, 2021

(65) Prior Publication Data
US 2023/0182367 A1    Jun. 15, 2023

(51) Int. Cl.
| | | |
|---|---|---|
| *B29C 49/06* | (2006.01) | |
| *A47G 19/22* | (2006.01) | |
| *B29L 31/00* | (2006.01) | |

(52) U.S. Cl.
CPC .......... *B29C 49/06* (2013.01); *A47G 19/2205* (2013.01); *B29L 2031/7132* (2013.01)

(58) Field of Classification Search
CPC ...... B65D 25/22; B65D 11/20; B65D 1/0261; B65D 1/0284; B65D 23/001; A47G 19/2255; A47G 19/2205; B29C 49/06
USPC ........ 215/377, 376; 220/636, 635, 628, 602, 220/662, 703; D7/531, 524, 509
See application file for complete search history.

(56) References Cited

U.S. PATENT DOCUMENTS

| | | | | |
|---|---|---|---|---|
| 2,203,647 | A * | 6/1940 | Cunningham | A47G 19/2205 428/34.4 |
| 3,482,731 | A * | 12/1969 | Douty | B65D 25/24 215/377 |
| 2005/0242102 | A1 * | 11/2005 | Groppo | A47G 19/2205 220/628 |
| 2010/0124594 | A1 * | 5/2010 | Burroughs | A47G 19/2205 220/636 |
| 2016/0007783 | A1 * | 1/2016 | Melton | B65D 81/3869 264/250 |
| 2022/0053956 | A1 * | 2/2022 | Barichello | A47G 19/2255 |

FOREIGN PATENT DOCUMENTS

| | | | | |
|---|---|---|---|---|
| CA | | 2631912 A1 * | 11/2008 | A47G 19/2205 |
| WO | WO-2012072661 A1 * | | 6/2012 | A47G 19/2255 |
| WO | WO-2015063319 A1 * | | 5/2015 | A47G 19/2205 |

* cited by examiner

*Primary Examiner* — Robert J Hicks
(74) *Attorney, Agent, or Firm* — Egbert, McDaniel & Swartz, PLLC (57) ABSTRACT

A transparent plastic integrally molded goblet has a cup-shaped part, a columnar first leg and a disc-shaped first base integrally molded from transparent plastics. The bottom edge of the cup-shaped part extends downwards to form the first leg. The bottom end of the first leg integrally forms the first base. The cup-shaped part has a circumferential wall which encloses the circumference of a first space. The top edge of the circumferential wall forms an annular first ring frame, and the central part of bottom edge of the first base downwards forms a first convex pin. The integral molding of transparent plastics can enhance the appearance integrity of the goblet, the manufacture of the goblet is easy and the product yield is increased.

3 Claims, 9 Drawing Sheets

TRANSPARENT PLASTIC INTEGRALLY MOLDED GOBLET

CROSS-REFERENCE TO RELATED U.S. APPLICATIONS

Not applicable.

BACKGROUND OF THE INVENTION

1. Field of the Invention

The present invention relates generally to a goblet, and more particularly to the disclosure of an innovative structural type of a transparent plastic integrally molded goblet.

2. Description of Related Art Including Information Disclosed Under 37 CFR 1.97 and 37 CFR 1.98

The goblet is a ware for drinking, comprising a cup, a slender columnar leg and a base, wherein the cup is a container with the top edge forming the rim of the cup, the top end of the leg is connected to the bottom edge of the cup, and the bottom of the leg is connected to the top edge of the base. The goblet can be made of glass, crystal or plastics. When a goblet made of glass is impacted or tilted, the cup or the leg is likely to be damaged due to the fragility of glass. The goblet made of crystal is unlikely to be popularized for high cost, while the goblet made of plastics is low cost and unbreakable.

In terms of the known goblet made of plastics, the cup, the leg and the base are formed in molds respectively, and then the cup, the leg and the base are combined by connection structures or high frequency heating.

In terms of the goblet bonded by using connection structures, the connection structures are likely to ruin the integrity of appearance, which is adverse to forming a transparent goblet. Different ornamental shapes are formed outside in general, so that said connection structures are unlikely to be visually detected. In terms of the goblet bonded by using high frequency heating means, as the operational technique of high frequency heating is insufficient, there are joint marks formed at the interfaces of the cup, the leg and the base. If the goblet is made of transparent material, said joint marks are likely to be visually detected, forming an adverse effect on the integrity of appearance. The overall process of the known goblet made by using connection structures or high frequency heating means to bond the cup, the leg and the base which are molded respectively is complex.

BRIEF SUMMARY OF THE INVENTION

The primary object of the present invention is to provide a transparent plastic integrally molded goblet. The technical problem to be solved is to break through how to develop a novel transparent plastic integrally molded goblet with more ideal practicability.

Based on said object, the present invention provides a transparent plastic integrally molded goblet, which comprises a cup-shaped part, a columnar first leg and a disc-shaped first base integrally molded from transparent plastics, wherein the bottom edge of the cup-shaped part extends downwards to form the first leg, and the bottom end of the first leg integrally forms the first base. A first space is formed inside the cup-shaped part. The first space communicates with the exterior of the cup-shaped part through the top edge of the cup-shaped part. The cup-shaped part has a circumferential wall which encloses the circumference of the first space. The inside diameter of the circumferential wall at the top end is smaller than the maximum inside diameter of the circumferential wall. The top edge of the circumferential wall forms an annular first ring frame. The annular inner edge and outer edge of the first ring frame protrude from the inner circumference and outer circumference of the circumferential wall respectively. The central part of the bottom edge of the first base downwards forms a first convex pin. The bottom edge of the first base rises upwards to form a first arch face. The first arch face surrounds the circumference of the first convex pin, and the bottom end of the first convex pin is located between the outer circumference of the first arch face and the inner circumference of the first arch face, so that the first base is stably configured on a plane.

Based on the innovative structure type and technical characteristics, as compared to the prior art, the present invention can enhance the integrity of appearance, the manufacture of the goblet is easy and the product yield is increased, and practical progressiveness is achieved.

DETAILED DESCRIPTION OF THE INVENTION

The figures show the preferred embodiments of the transparent plastic integrally molded goblet of the present invention, but the embodiments are for illustration only, the patent application is not limited to this structure.

Figure 1:
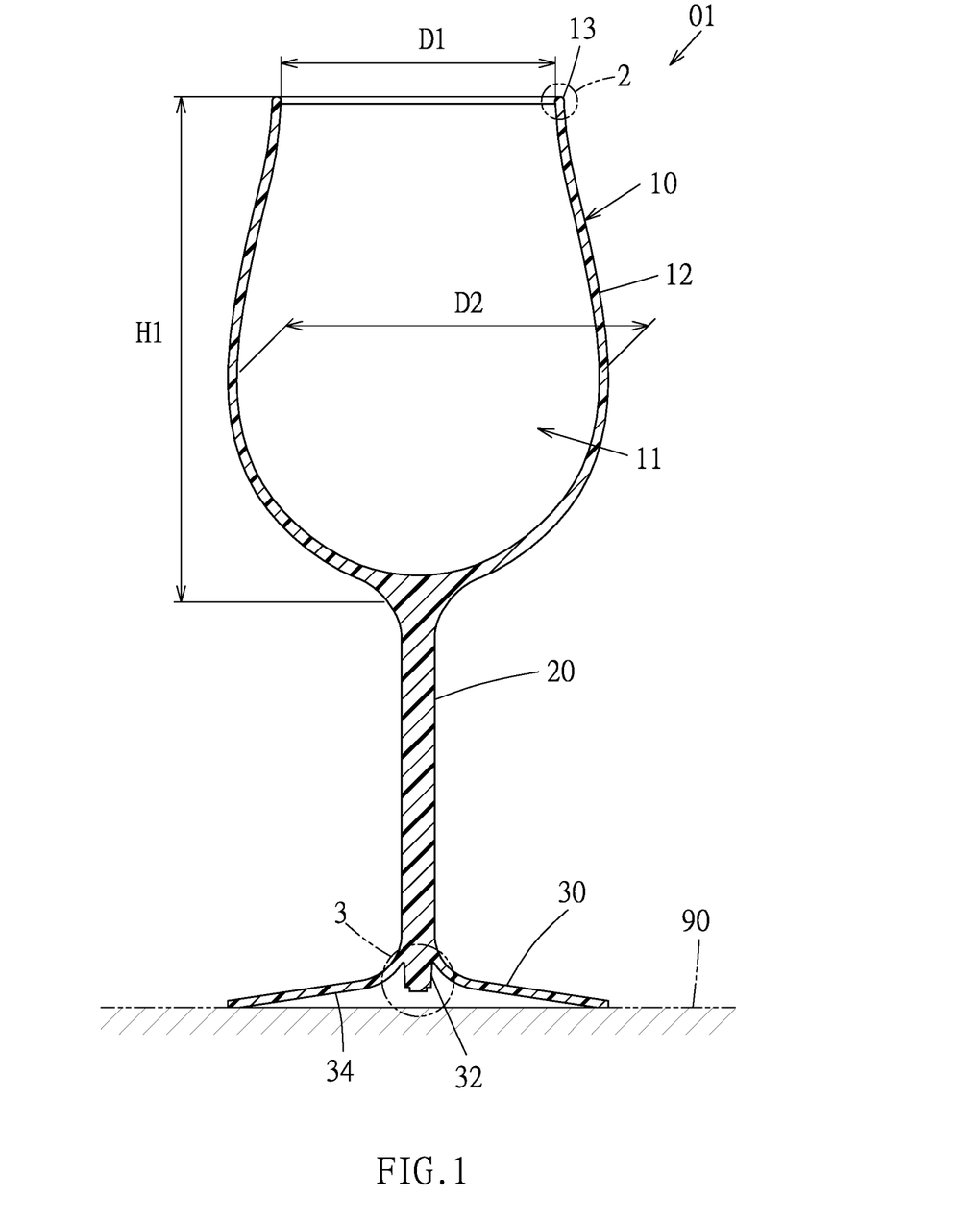
FIG. 1 is a sectional view of the preferred embodiment of the present invention.
Figure 2:
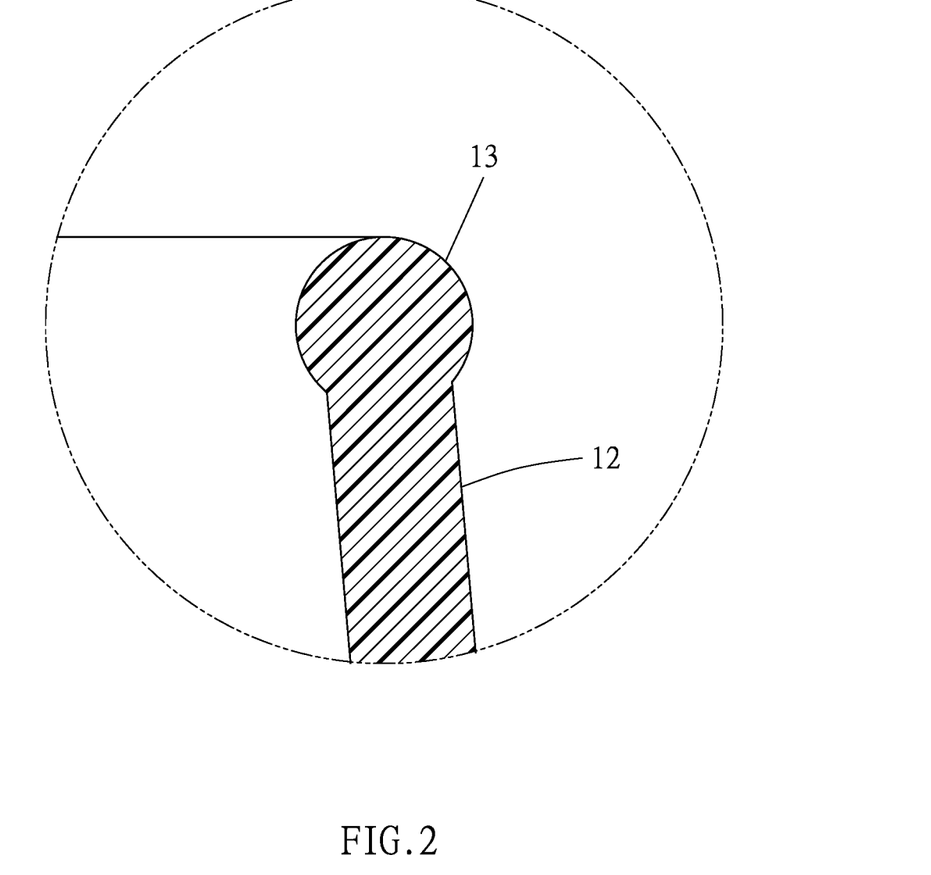
FIG. 2 is a drawing of partial enlargement of FIG. 1.
Figure 3:
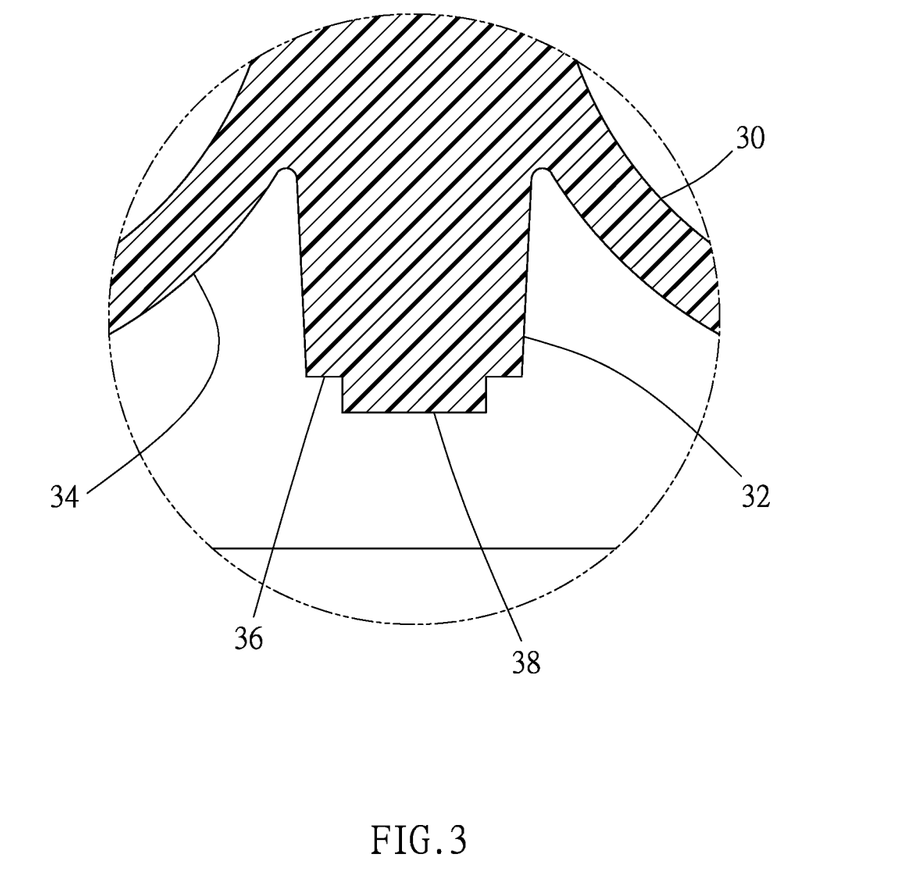
FIG. 3 is a drawing of partial enlargement of FIG. 1.

The preferred embodiment of said transparent plastic integrally molded goblet 01 comprises a cup-shaped part 10, a columnar first leg 20 and a disc-shaped first base 30 integrally molded from transparent plastics. The bottom edge of the cup-shaped part 10 extends downwards to form the first leg 20. The bottom end of the first leg 20 integrally forms the first base 30. A first space 11 is formed inside the cup-shaped part 10. The first space 11 communicates with the exterior of the cup-shaped part 10 through the top edge of the cup-shaped part 10. The cup-shaped part 10 has a circumferential wall 12 which encloses the circumference of the first space 11. The inside diameter D1 of the circumferential wall 12 at the top end is smaller than the maximum inside diameter D2 of the circumferential wall 12. The top edge of the circumferential wall 12 forms an annular first ring frame 13. The annular inner edge and outer edge of the first ring frame 13 protrude from the inner circumference and outer circumference of the circumferential wall 12 respectively. The central part of the bottom edge of the first base 30 downwards forms a first convex pin 32. The bottom edge of the first base 30 rises upwards to form a first arch face 34. The first arch face 34 surrounds the circumference of the first convex pin 32, and the bottom end of the first convex pin 32 is located between the outer circumference of the first arch face 34 and the inner circumference of the first arch face 34, so that the first base 30 is stably configured on a plane 90. The first convex pin 32 forms a first bearing face 36.

Figure 4:
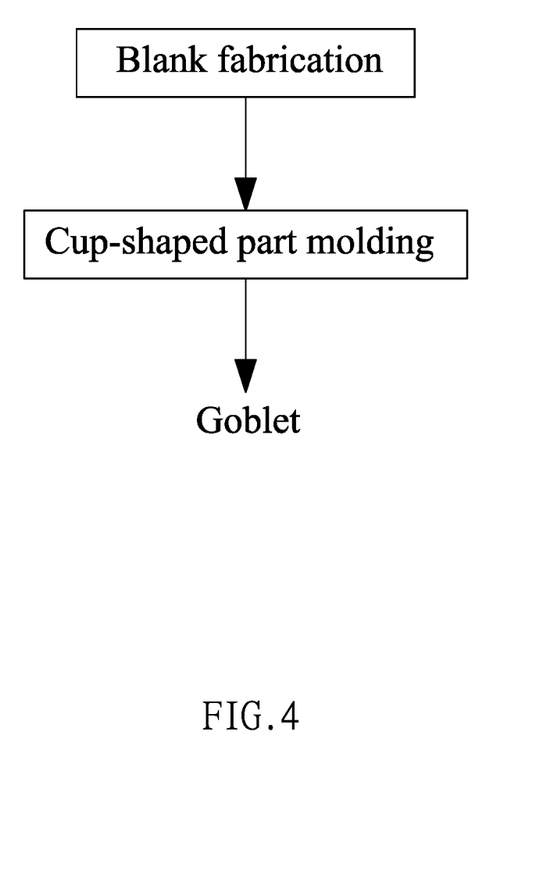
FIG. 4 is a manufacturing process chart of the preferred embodiment of the present invention.

The method to manufacture the goblet 01 demonstrated in the preferred embodiment comprises the following steps:

Blank manufacture: a blank 02 is made of transparent plastics by injection molding.

Figure 5:
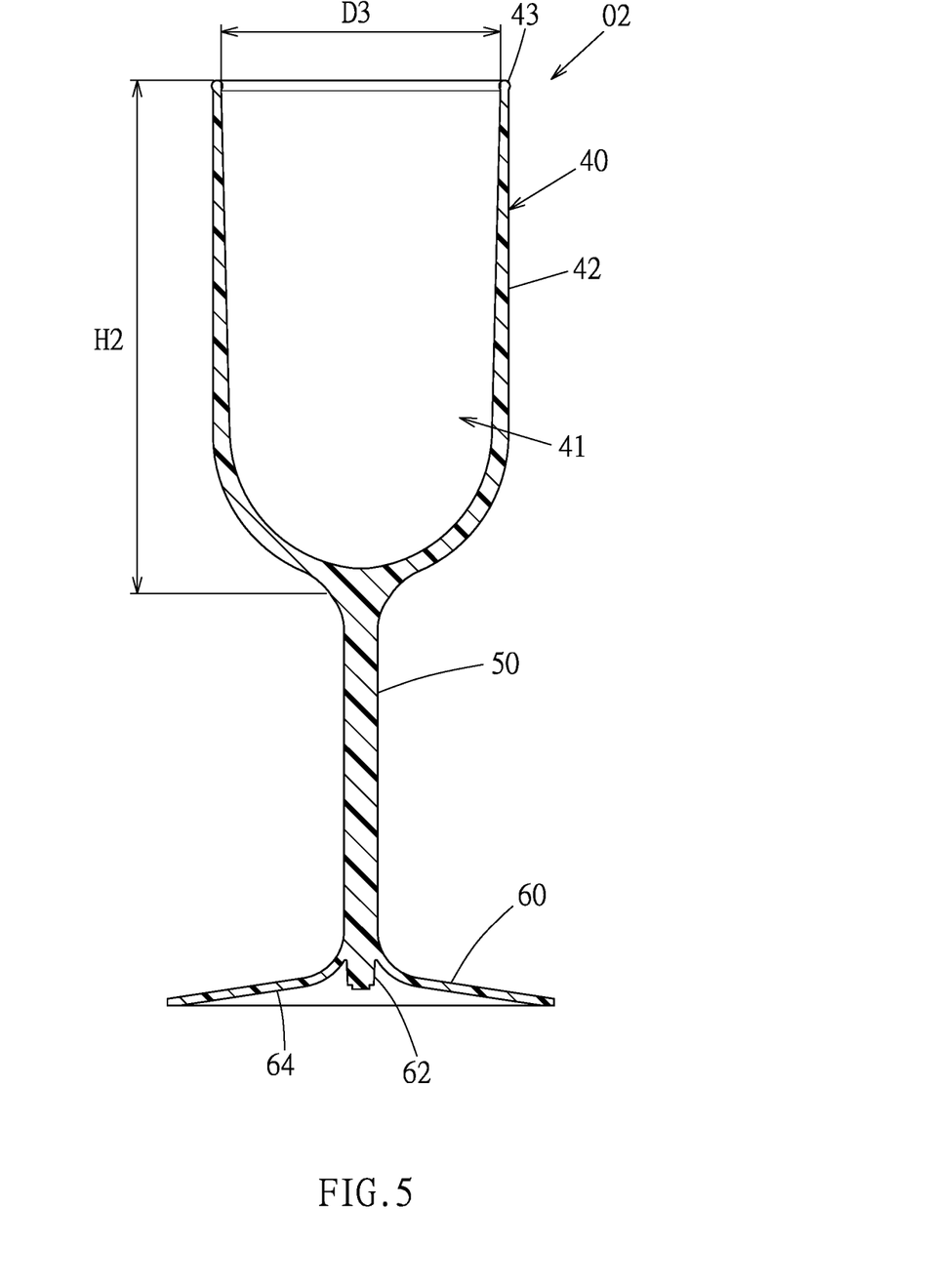
FIG. 5 is a sectional view of the blank for manufacturing the preferred embodiment of the present invention.

The blank 02 is integrally molded from a cup-shaped blank 40, a columnar second leg 50 and a disc-shaped second base 60. The bottom edge of the cup-shaped blank 40 extends downwards to form the second leg 50. The bottom end of the second leg 50 integrally forms the second base 60. A second space 41 is formed inside the cup-shaped blank 40. The second space 41 communicates with the exterior of the cup-shaped blank 40 through the top edge of the cup-shaped blank 40. The cup-shaped blank 40 has an annular wall 42 which encloses the circumference of the second space 41. The top edge of the annular wall 42 forms an annular ring frame 43. The annular inner edge and outer edge of the second ring frame 43 protrude from the inner circumference and outer circumference of the annular wall 42 respectively. The inside diameter D3 of the annular wall 42 decreases from the second ring frame 43 to the second leg 50. The central part of bottom edge of the second base 60 downwards forms a second convex pin 62. The bottom edge of the second base 60 rises upwards to form a second arch face 64. The second arch face 64 surrounds the circumference of the second convex pin 62, and the bottom end of the second convex pin 62 is located between the outer circumference of the second arch face 64 and the inner circumference of the second arch face 64. The second convex pin 62 forms a second bearing face 66. The second convex pin 62 is located in the axial extension of the second leg 50, and the second convex pin 62 and the second leg 50 are coaxially aligned. The change in the inside diameter D3 can be induced by the pattern draft of injection molding of the annular wall 42, and the change in the inside diameter D3 can be induced by the selection of specific shape of the cup-shaped part 10.

The first ring frame 13 and the second ring frame 43 have the same inside diameter. The distance between the first ring frame 13 and the first leg 20 of the cup-shaped part 10 is defined as H1, the distance between the second ring frame 43 and the second leg 50 of the cup-shaped blank 40 is H2, and 0.9H1≤H2≤H1.

Figure 6:
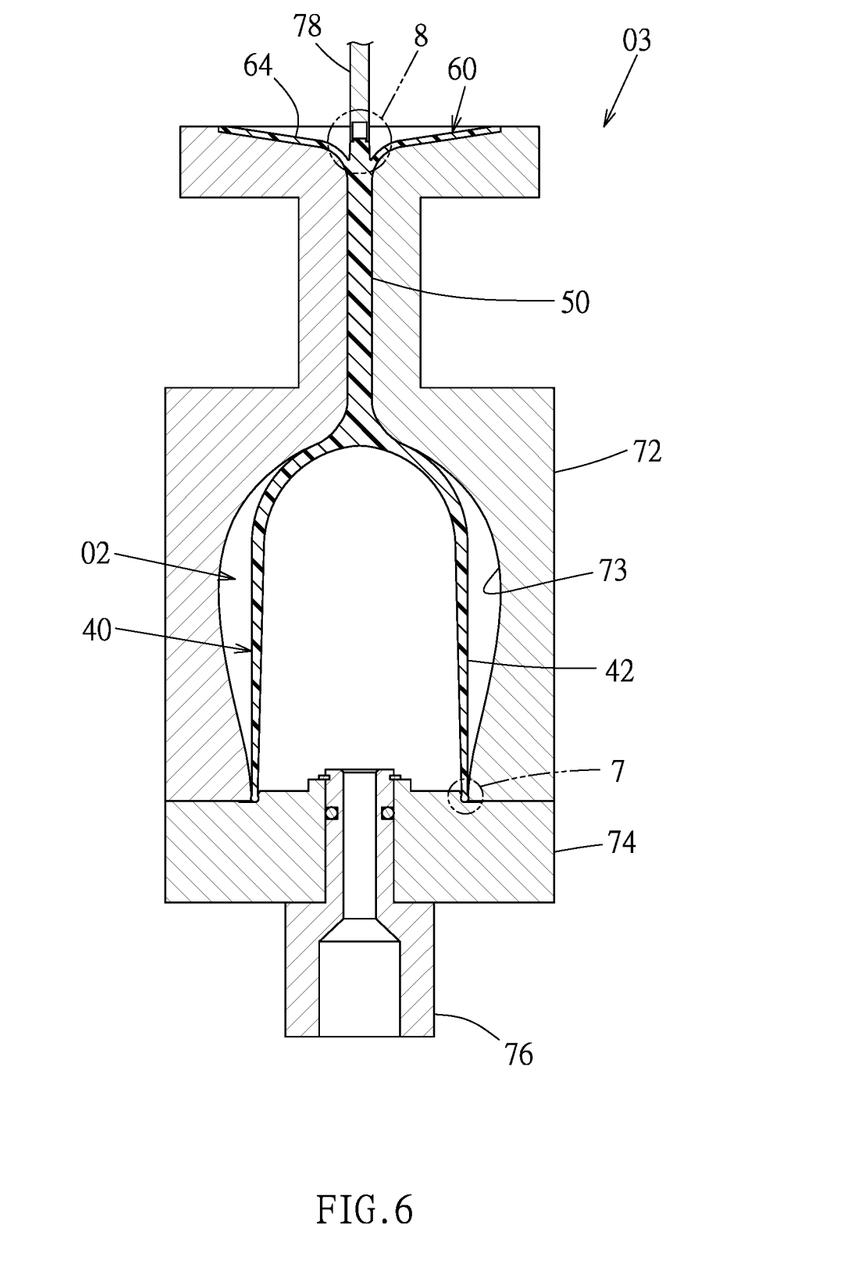
FIG. 6 is a schematic diagram of the molded state of the preferred embodiment of the present invention, showing the state of blank inserted into the blow mold.
Figure 9:
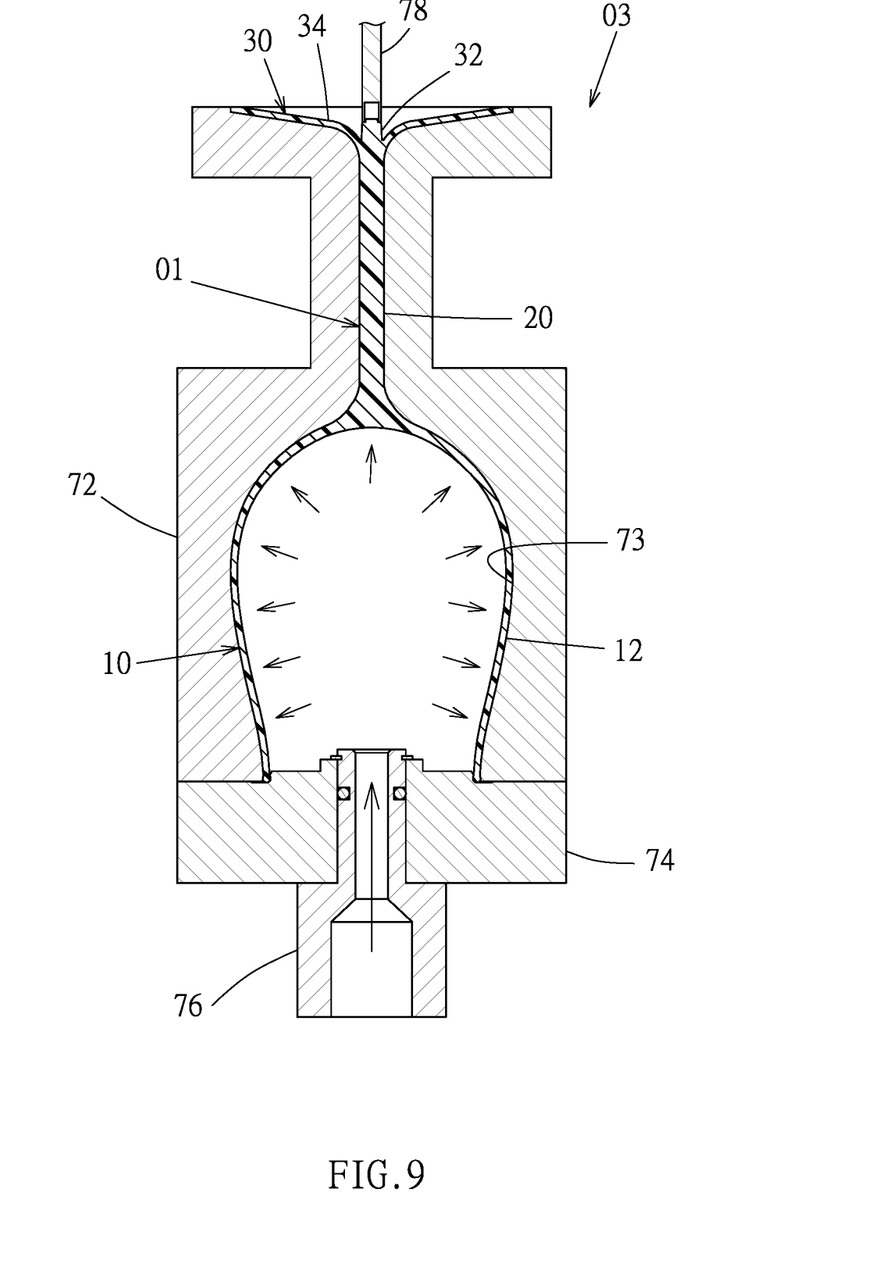
FIG. 9 is a schematic diagram of the molded state of the preferred embodiment of the present invention, showing the state of the preferred embodiment of blow molding.

Cup-shaped part molding: the blank 02 is disposed in a blow mold 03, the cup-shaped blank 40 is heated, and the compressed air is fed into the second space 41, the cup-shaped blank 40 is shaped into the cup-shaped part 10 by blow molding to prepare the goblet 01.

Figure 7:
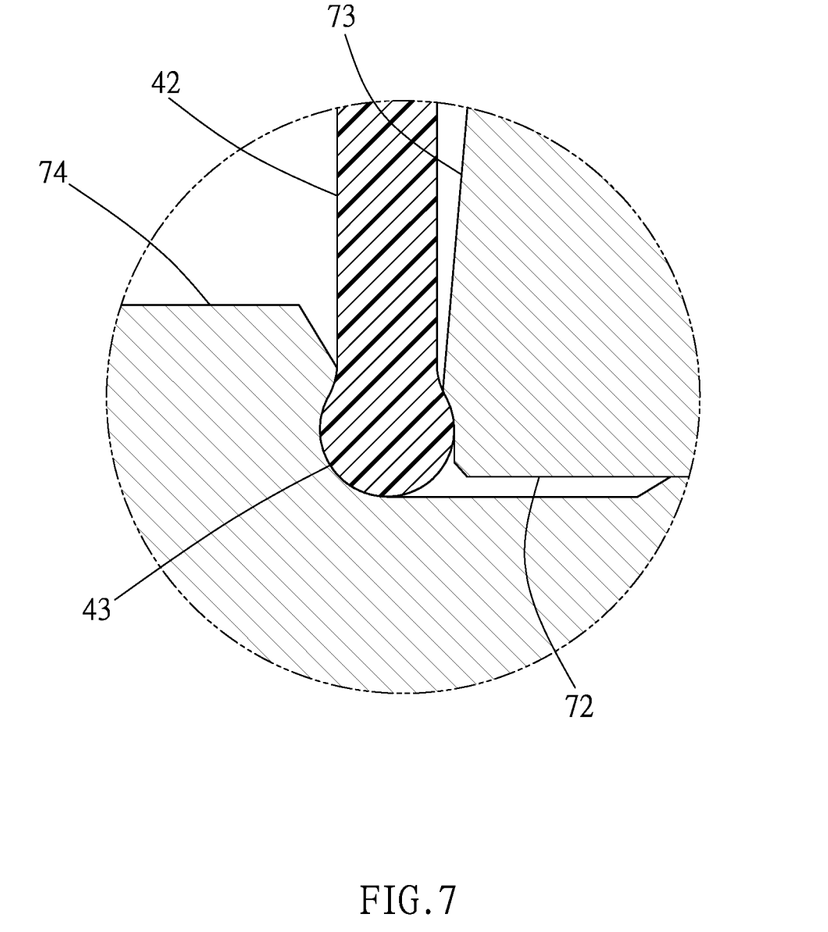
FIG. 7 is a drawing of partial enlargement of FIG. 6.

The blow mold 03 has a main body 72, a fixing part 74, a blowing part 76 and a propping part 78. A molding cavity 73 is formed inside the main body 72. The surface of the molding cavity 73 and the outer surface of the cup-shaped part 10 form male-female coordination, so that the cup-shaped blank 40 is inserted into the molding cavity 73. The fixing part 74 is disposed at one end of the main body 72, so that the fixing part 74 and the main body 72 oppositely cramp the second ring frame 43 to localize one end of the cup-shaped blank 40. The blowing part 76 is disposed in the fixing part 74, so as to feed compressed air into the second space 41, and to form the cup-shaped blank 40 into the cup-shaped part 10 by blow molding. The propping part 78 is disposed at one end of the main body 72 far from the fixing part 74. The propping part 78 axially props the second bearing face 66, so that the propping part 78 and the fixing part 74 oppositely localize the blank 02.

When the blank 02 is shaped into the goblet 01, the second leg 50 becomes the first leg 20, the second base 60 becomes the first base 30.

Figure 8:
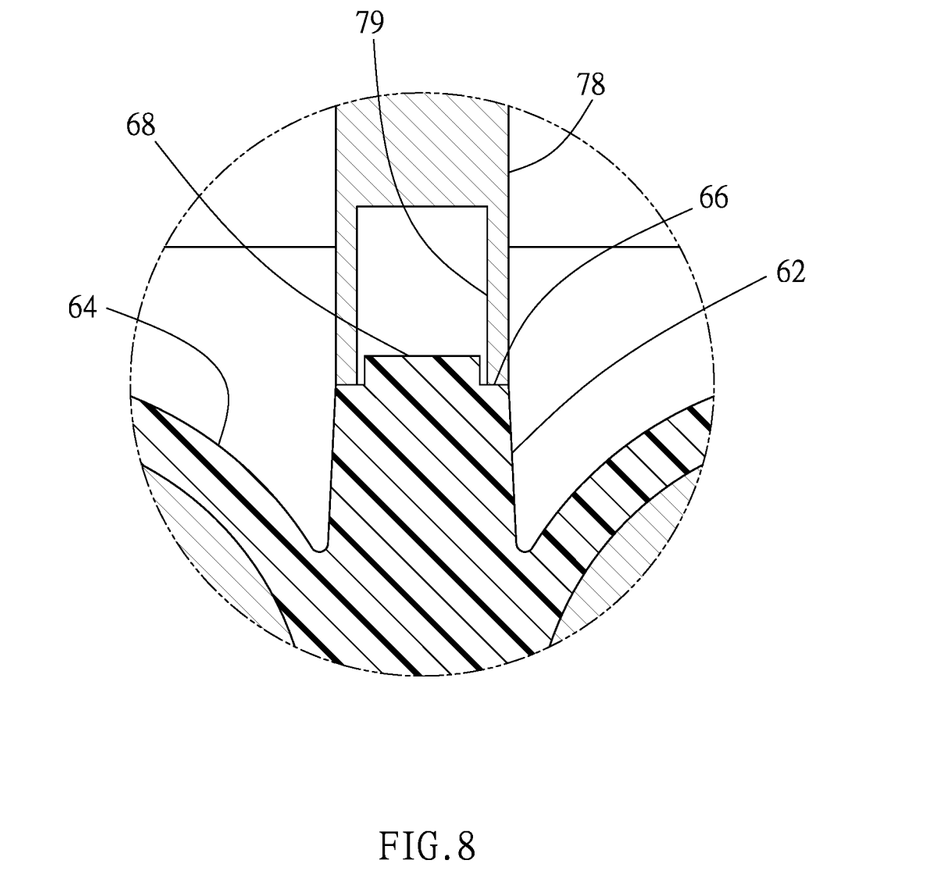
FIG. 8 a the drawing of partial enlargement of FIG. 1.

FIG. 8 shows that the second bearing face 66 is a ring surface, and the second bearing face 66 surrounds a second bulge 68, in combination with the formation of the second bulge 68, the propping part 78 forms a dent 79 for holding the second bulge 68. The second bulge 68 is the residue after the blank 02 is molded. The existence and specific shape of the second bulge 68 are optional implementation means of the molding of the blank 02, they cannot be the explanation for limiting the present invention, hereby, the shape of the first bearing face 36 and a first bulge 38 surrounded by the first bearing face 36 shown in FIG. 3 cannot be the explanation for limiting the present invention.

The goblet 01 is integrally molded from transparent plastics, differing from prior art which molds the cup-shaped part 10, the first leg 20 and the first base 30 respectively and combines them by using connection structures or high frequency heating. It is unnecessary to apply ornamental shapes to the appearance of the goblet 01 to cover the joint marks resulted from said connection structures or high frequency heating, favorable for using transparent plastics to prepare the goblet 01, and the appearance is integral.

The blank 02 is prepared from transparent plastics by injection molding, and then the blank 02 is molded by blowing, so that the cup-shaped blank 40 changes into the cup-shaped part 10. As such, goblet 01 with good transparency and appearance integrity is prepared.

The inside diameter D3 of the annular wall 42 decreases from the second ring frame 43 to the second leg 50. In the injection molding of the blank 02, the cup-shaped blank 40 is easy to demold, the complexity of the injection mold for the blank 02 is reduced, and then the cup-shaped blank 40 is made into the cup-shaped part 10 by blow molding, even if the inside diameter D1 of the circumferential wall 12 at the top end is smaller than the maximum inside diameter D2 of the circumferential wall 12, the cup-shaped part 10 can be molded easily and reliably.

In the process of blow molding the cup-shaped blank 40 into the cup-shaped part 10, the main body 72 and the fixing part 74 oppositely cramp the second ring frame 43. As such, the reliability of deformation of the cup-shaped blank 40 under the effect of the compressed air is enhanced, the manufacture of the goblet 01 is easy and the product yield is increased. In combination with the propping effect of the propping part 78 on the second bearing face 66, in the process of transforming the cup-shaped blank 40 into the cup-shaped part 10, the propping part 78 is provided for the second base 60 and the second leg 50 to resist the acting force formed by the compressed air. As such, in the process of shaping the blank 02 into the goblet 01, the localization reliability of the blank 02 is high.

We claim:

1. A goblet comprising:
   a cup-shaped part;
   a columnar first leg;
   a disc-shaped first base integrally molded with said cup-shaped part and said columnar first leg, wherein a bottom edge of said cup-shaped part extends downwardly to said columnar first leg, a bottom end of said columnar first leg being connected with said disc-shaped first base, said cup-shaped part having a first space therein, the first space communicating with an exterior of said cup-shaped part through a top edge of said cup-shaped part, said cup-shaped part having a circumferential wall that encloses a circumference of the first space, an inside diameter of the circumferential wall being smaller at a top end thereof than a maximum inside diameter of the circumferential wall, the top of the circumferential wall defining an annular first ring frame, wherein an annular inner edge and outer edge of the annular first ring frame protrude respectively from an inner circumference and an outer circumference of the circumferential wall, wherein a center part of a bottom edge of said disc-shaped first base forms a first convex pin, the bottom edge of said disc-shaped first base rising upwardly to form a first arch face, the first arch face surrounding a circumference of the first convex pin, a bottom edge of the first convex pin being located between an outer circumference of the first arch face and an inner circumference of the first arch face such that said disc-shaped first base is on a plane.

2. The goblet of claim 1, wherein the goblet is blow molded from a blank, wherein a bottom edge of the blank extends downwardly to form a second leg, a bottom of the second leg integrally forming a second base, wherein a second space is formed inside the blank, the second space communicating with an exterior of the blank through a top edge of the blank, the blank having an annular wall that encloses a circumference of the second space, wherein a top edge of the annular wall of the blank defines an annular second ring frame, an annular inner edge and outer edge of the annular second ring frame protruding respectively from an inner circumference and an outer circumference of the annular wall, wherein an inside diameter of the annular wall decreases from the annular second ring frame to the second leg, a central part of a bottom edge of the second base rising upwardly to form a second arch face, the second arch face surrounding a circumference of the second convex pin, wherein a bottom end of the second convex pin is located between an outer circumference of the second arch face and an inner circumference of the second arch face, the second convex pin forming a second bearing face, the second convex pin being located in an axial extension of the second leg, the second convex pin and the second leg being coaxially aligned, wherein the first ring frame and the second ring frame have identical inside diameters, wherein a distance between the first ring frame and the first leg of said second convex pin is H1, wherein a distance between the second ring frame and the second leg of the blank is H2, wherein $0.9H1 \leq H2 \leq H1$.

3. A method for manufacturing the goblet of claim 2, the method comprising:
injecting molding the blank of transparent plastic;
disposing the blank in a blow mold, the blow mold having a main body, a fixing part, a blowing part and a propping part, the main body having a molding cavity, the blank having a V-shape and being inserted into the molding cavity, wherein the fixing part is disposed at one end of the main body such that the fixing part and the main body oppositely cramp the second ring frame so as to locate one end of the blank, the blowing part being disposed in the fixing part, the propping part being disposed at one end of the main body away from the fixing part, the propping part axially propping the second bearing face such that the propping part and the fixing part oppositely localizing the blank;
heating the disposed blank; and
feeding compressed air into the second space so as to form said cup-shaped part.

* * * * *